Sept. 16, 1930.  F. W. GAY  1,775,757
PROPULSION OF BODIES
Filed Nov. 14, 1928  3 Sheets-Sheet 2
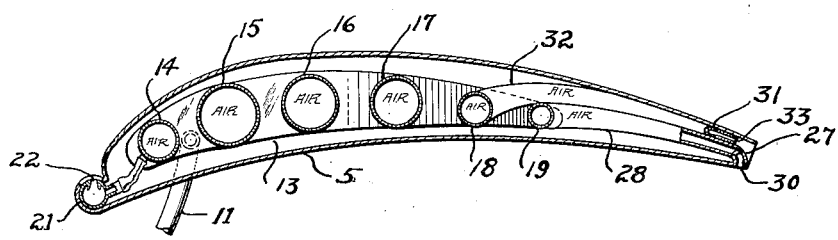
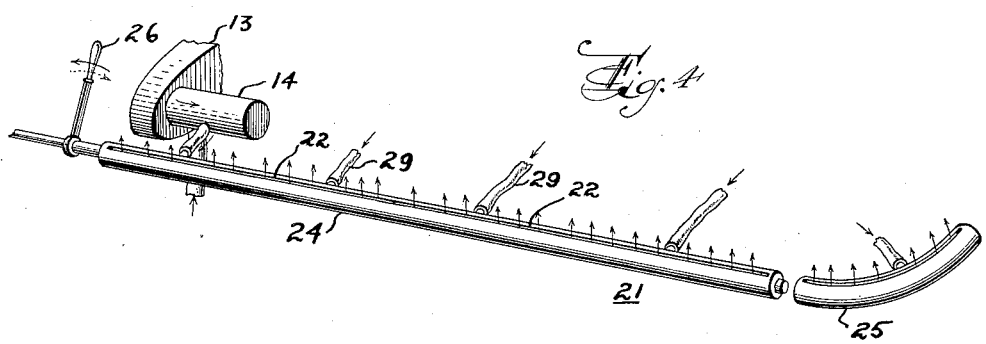
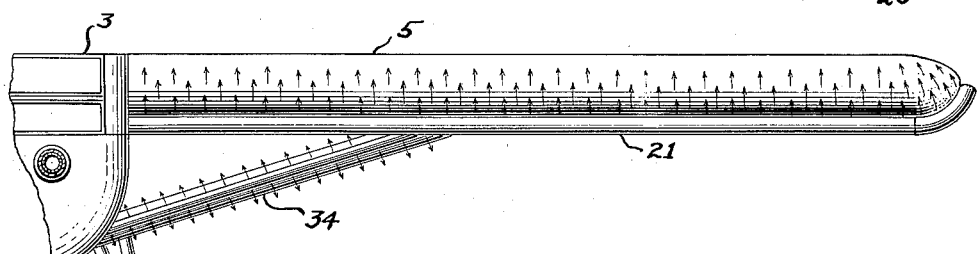
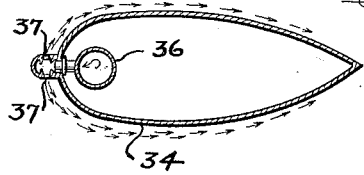
INVENTOR
*FRAZER W. GAY*
BY
*George D. Richards*
ATTORNEY Sept. 16, 1930.          F. W. GAY          1,775,757
PROPULSION OF BODIES
Filed Nov. 14, 1928          3 Sheets-Sheet 3
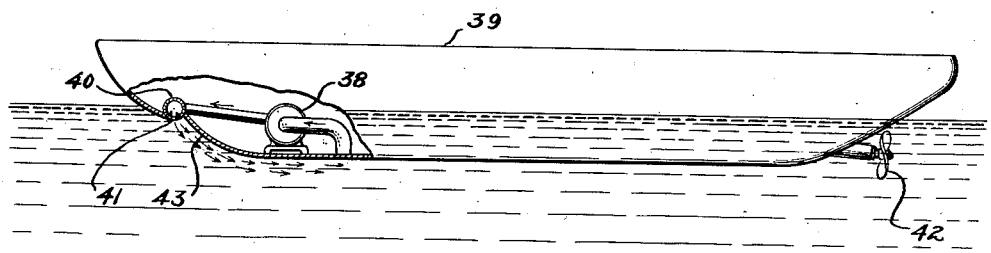
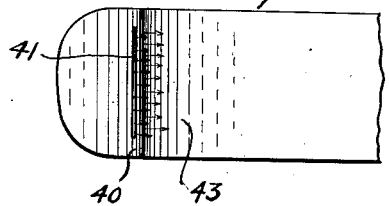    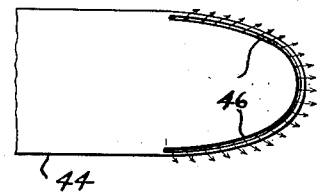
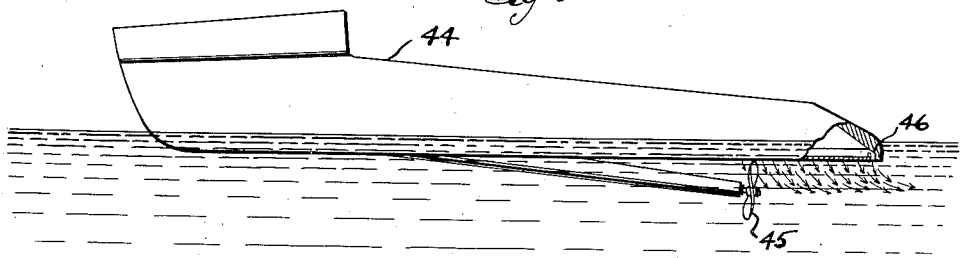
INVENTOR
FRAZER W. GAY
BY
ATTORNEY Patented Sept. 16, 1930

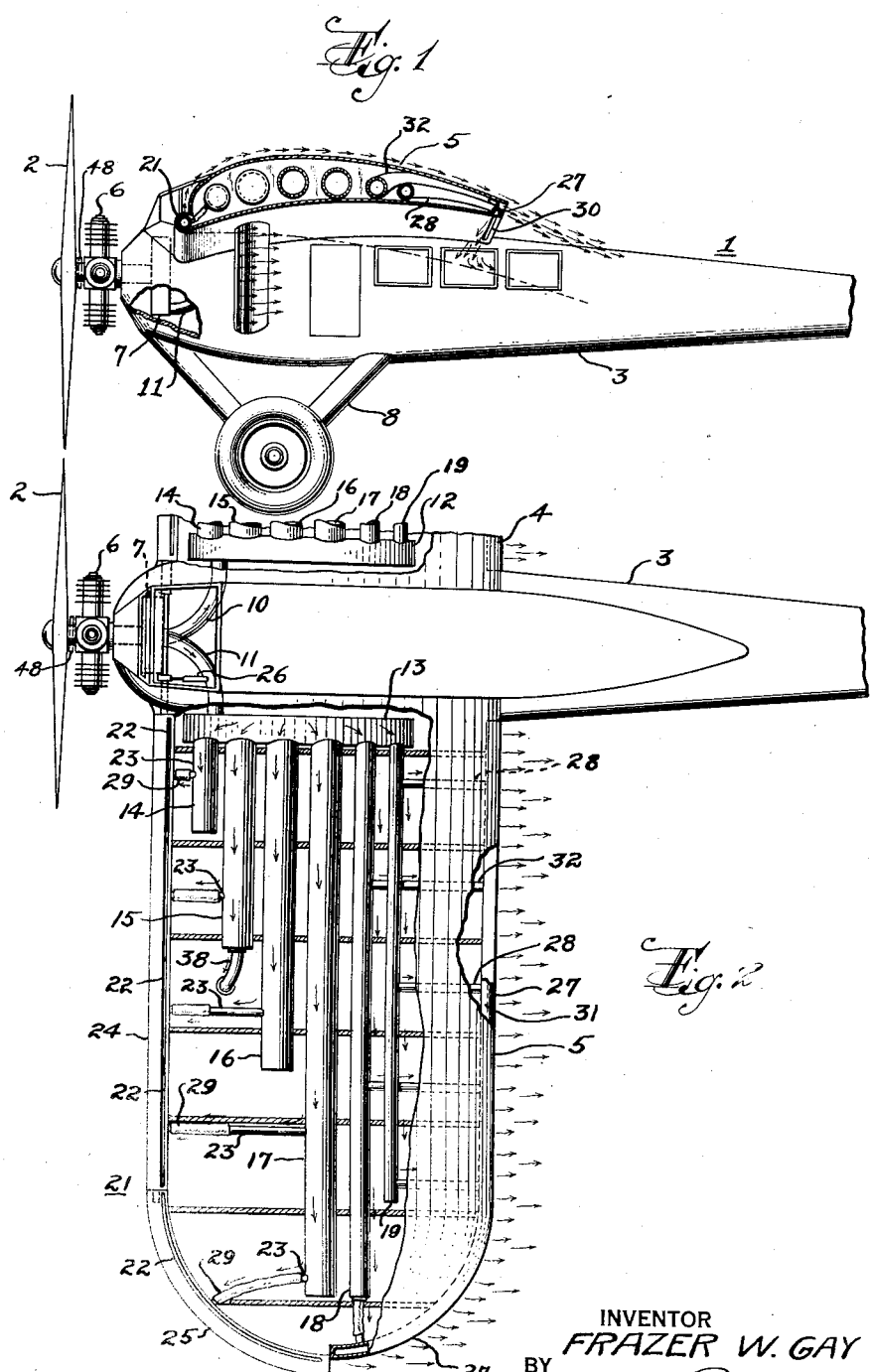

1,775,757

UNITED STATES PATENT OFFICE

FRAZER W. GAY, OF NEWARK, NEW JERSEY

PROPULSION OF BODIES

Application filed November 14, 1928. Serial No. 319,212.

This invention relates, generally, to the propulsion of bodies through fluid mediums; and the invention has reference, more particularly, to a novel arrangement and construction of fluid directing orifices such as nozzles that are adapted to be carried by the propelled bodies and to eject fluid at such angles as to effect a reduction in the resistance or drag of the fluid medium to the propulsion of such bodies therethrough, while at the same time to provide a force if desired upon the propelled body in a direction substantially at right angles to the direction of motion of the bodies, which force may be employed, for example, to counteract in whole or in part the effect of gravity on such bodies.

Bodies are commonly propelled through fluids by the use of propellers or screws which drive the bodies forward against the resistance of the fluid medium. If the bodies are tipped upwardly in the direction of travel, the resistance of the medium may be depended upon to overcome in whole or in part the downward pull of gravity upon such bodies.

Referring especially to stream line bodies such as cambered airplane wings, it is well known that when a fluid stream passes a properly designed body or wing of this character, the fluid as it approaches the wing is directed upwardly and as this fluid compelled to change its angular velocity in passing along the upper cambered surface of the wing a subnormal pressure or partial vacuum is produced on this surface which acts to support the wing.

An object of this invention is to provide jets of fluid in advance of the moving body, which jets are calculated to give momentum to the fluid medium in a direction away from the moving body and substantially at right angles to the direction of motion thereof, so that the moving body is urged by the action of the normal fluid pressures on the rear surfaces thereof into the space having a subnormal pressure that is vacated by the displaced fluid.

Another object of the invention is to so direct fluid jets as to effect a lifting action upon the moving body when desired, and further to maintain the continuity of fluid flow beyond the rear portions of the moving body by directing jets from the rear of such body in the direction of fluid flow.

Still another object of the invention is to provide means for varying the force and volume of the emitted jets as desired, to thereby enable the moving body such as a wing to operate at a uniformly high efficiency at all speeds regardless of fixed wing contours which cause wings as normally operated to have a high efficiency for one speed only and lower efficiencies for other speeds.

Other objects of this invention, not at this time more particularly enumerated, will be clearly understood from the following detailed description of the same.

The invention is clearly illustrated in the accompanying drawings, in which:—

Fig. 1 is a side view with parts broken away of an airplane embodying the principles of the present invention;

Fig. 2 is a partial plan view with parts broken away of the airplane shown in Fig. 1;

Fig. 3 is an enlarged sectional view of the airplane wing;

Fig. 4 is an enlarged perspective view of a portion of the wing structure;

Fig. 5 is a view in front elevation with parts broken away of the airplane;

Fig. 6 is a cross section of one of the struts of the airplane.

Fig. 7 is a side view with parts broken away of a ship embodying the principles of the present invention;

Fig. 8 is a view looking at the bottom of the front portion of the ship of Fig. 7;

Fig. 9 is a view of a speed boat also embodying the principles of the present invention; and Fig. 10 is a view looking at the bottom of the rear portion of the boat of Fig. 9.

Similar characters of reference are employed in all of the hereinabove described views, to indicate corresponding parts.

Referring now to said drawings, the reference character 1 indicates the airplane as a whole having a propeller 2, a fuselage 3, landing gear 8 and wings 4 and 5. Propeller 2 is driven by an internal combustion engine 6, which also, according to the preferred arrangement, drives a blower or fan 7. Blower 7 is connected by conduits or pipes 10 and 11 to headers 12 and 13 respectively, preferably positioned within the wings 4 and 5. Headers 12 and 13 are adapted to supply air from the blower 7 to a plurality of pipes that are connected to these headers 12 and 13 and extend within the wings 4 and 5. Wings 4 and 5 together with their contained piping are similar and extend in opposite directions from the fuselage 3. Since these wing structures are similar, only one of them, namely wing 5, will be described. The pipes connected to header 13 within wing 5 are designated 14 to 19 and extend lengthwise from the base of the wing toward the tip thereof. These pipes are adapted to supply air to nozzles extending along the leading edge, around the wing tip and along the trailing edge of the wing. These nozzles are adapted to eject air in such directions as to increase the lift and decrease the drag of the wing during flight of the aeroplane 1.

In carrying out the invention, a conduit or pipe 21 is positioned so as to extend along the leading edge of the wing 5. Feeder pipes 23 serve to supply air from the pipes 14, 15, 16 and 17 to conduit 21. Conduit 21 is provided in its upper surface with a plurality of longitudinally extending slits 22. These slits have nozzle shaped cross sections as especially illustrated in Fig. 3 and are adapted to eject a thin sheet of air at a relatively high velocity from the upper side of the conduit 21 and in a direction that is substantially perpendicular to the direction of motion of the wing. This sheet of air traveling at a relatively high velocity impinges upon the much greater but slower moving mass of oncoming air that is passing over the upper surface of the wing. This greater mass of air is thusly deflected upwardly somewhat and away from the leading edge and adjacent upper portions of the wing surface. In other words, the upward blast of air from the slits 22 acts by its momentum to accelerate the mass of air in advance of the wing upwardly and away from the upper wing surface while the reaction of this larger mass of air acts to deflect this sheet of air backward along a contour somewhat similar to that of the wing as illustrated by the arrows in Figs. 1, 4 and 5. The sheet of air from the slits 22 thus acts to relieve the adjacent portion of the leading edge and upper wing surfaces from the pressure of the oncoming mass of air, thereby greatly reducing the drag on the wing. This displacing of the air in advance of the wing by the action of the jet creates a region of reduced pressure extending over the upper and front edge surfaces of the wing which also results in an increased lift of the wing. This will be apparent when it is noted that the backward and downward curvature of the wing may be made greater than the resultant backward and downward trajectory of the combined air stream passing over the upper wing surface. Since these two curvatures do not coincide, there will result an intermediate region of reduced pressure extending over the upper surfaces of the wing and effecting a substantial increase in the lift thereof. The sheet of air from the slits 22 acts to uniformly displace the oncoming air without disturbing the smooth flow of such air over the upper surfaces of the wing or causing any burbling over these surfaces.

The conduit 21 is illustrated as comprising two sections, an adjustable section 24 extending along the leading edge and a stationary section 25 extending partly around the wing tip. The section 24 may be turned about its longitudinal axis as by means of a hand lever 26 so as to vary the angle which the emitted air jet or sheet makes with respect to the direction of motion of the wing, thereby correspondingly varying the lifting and anti-drag effect of such emitted sheet of air. Flexible hose couplings 29 of rubber or other suitable material connect the pipes 23 to nipples on the conduit section 24, to thereby permit relative angular movement of section 24 with respect to the pipes 14 to 17. The stationary section 25 extending partly around the wing tip cannot readily be angularly adjusted owing to its curvature and so it is retained in a fixed position with respect to the wing.

In order to even further increase the lift of the wing, a conduit 27 similar to conduit 21 may extend along the trailing edge of the wing and eject a downwardly flowing air stream. This conduit is illustrated as completely contained within the wing interior so as not to increase the drag thereof. Feeder pipes 28 serve to supply air from the pipe 19 to the conduit 27. Conduit 27 is provided on its under surface with a nozzle shaped slit 30 that is adapted to direct a sheet of air downwardly substantially at right angles to the direction of motion of the wing.

In operation, the sheet of air blown downward from the slit 30 will accelerate downwardly the mass of air passing under the wing, thereby creating a region of increased pressure under the wing and in front of this sheet of air so as to effect a substantial increase in the lift of the wing. This downward stream of air acts somewhat as an air baffle which backs up air in front of the same, thereby increasing the pressure of the region under the wing without increasing the drag thereon inasmuch as the downward projected sheet of air is not physically attached to the wing.

Although, this downward sheet of air is illustrated as extending substantially at right angles to the direction of motion, it is to be understood that his stream may be projected at an angle other than a right angle if a greater lift is obtained thereby under any particular circumstances, for example this sheet of air may be directed somewhat forward of the perpendicular such as at an angle of forty-five degrees with the direction of motion. It is apparent that the conduit 27 may be angularly adjustable just as in the case of conduit 21.

The downwardly projected sheet of air from that portion of the conduit 27 that extends around a portion of the wing tip not only serves to increase the lift of the wing as a result of the action described above, but this sheet of air also reduces the normal wing-tip loss to a minimum. Normal wing tip loss is due to the tendency for the mass of air under the wing to flow out sidewise from under the wing tip without creating any lifting effect. Also a large portion of this air so escaping passes over on top of the wing, thereby ruining the efficacy of the suction thereover. The downward sheet of air from the conduit 27 at the wing tip, however, backs up and prevents such escape or spilling of air from under the wing tip, resulting in a much greater lift being derived from such wing tip.

In order that the air flow past the trailing edge of the wing may be uniform and smooth without burbling regardless of variations in the angle of incidence of the wing, a conduit 31 may be positioned within the wing at the trailing edge thereof and arranged to eject a sheet of air rearwardly in a direction that is substantially tangent to the upper wing surface at the trailing edge. Conduit 31 is also similar to conduit 21 and is supplied with air by means of feeder pipes 32 illustrated as connected to pipe 18. The nozzle shaped slit 33 of conduit 31 is substantially tangent to the upper wing surface at the trailing edge as especially illustrated in Fig. 3. The sheet of air ejected from the conduit 31 acts to fill the void that tends to develop just rearwardly of the trailing edge thus insuring an uniform air stream flow and reducing the drag on the wing.

It is to be noted that the power consumed by the blower 7 in supplying the conduits 21, 27 and 31 is far less than the power saved by the increase in operating efficiency of the wings 4 and 5. Also, since the mass of the sheet of air emitted by these conduits is relatively small the force reaction of these sheets of air upon their respective conduits is also relatively small so as not to adversely affect the angle of incidence of the wing.

If desired, a clutch 48 of any suitable type may be inserted between the propeller 2 and the engine 6. This is desirable as it enables the engine 6 to operate the blower 7, thereby maintaining considerable lift upon the wings even though the propeller 2 is not turning over and the forward speed of the airplane is low as when landing the airplane. During landing, it is necessary to slow down and finally practically stop the propeller in order to reduce the forward speed sufficiently to permit a safe landing. However, in the case of airplanes not equipped with the novel apparatus of this invention, the landing speed is dependent largely upon the load carried, so that with a relatively great load, a relatively high landing speed and consequently long run is necessary in order to maintain the desired lift. This is unfortunate, especially in the case of forced landings as the physical condition of the ground often severely limits the permissible length of run of the plane upon the ground. By using the novel apparatus of the present invention, the clutch 48 may be operated during landing to disconnect the propeller 2 while at the same time the engine 6 may be speeded up to thereby greatly increase the output of the blower 7 causing the lifting effect of the air jets to increase, to thereby compensate for the loss in forward velocity of the airplane and maintain the desired lift upon the wings. This permits the airplane to have a low landing speed regardless of load and enables the same to have an exceeding short run upon the ground.

It is apparent that more than one blower may be employed to supply air to the conduits 21, 27 and 31. Thus, an auxiliary independent internal combustion engine or engines may be employed to drive an auxiliary blower or blowers as the case may be for supplying air to the conduits 21, 27 and 31. Such auxiliary engine and blower, by supplying more air to the above conduits during take off of an airplane, increases the lift of the airplane wings and permits less use of the airplane elevators resulting in a consequent reduction in the drag produced by these control surfaces and a quicker take off. Also, by using such an auxiliary engine and blower, even though the main engine should stall, the wings will have a considerable lift owing to the action of the jets, thereby permitting a slow and safe landing.

It will be noted that the presence of the jet or sheet of air emitted from the conduit 21 effectively prevents the formation of anchor ice upon the leading edge and upper portions of the wing surfaces inasmuch as this jet causes the oncoming air to pass above the wing surface out of contact therewith. Also as the blower intake is normally just behind the engine 6, the air passing into the intake is somewhat warmed, thereby tending by its warmth to prevent the formation of anchor ice.

The resistance or drag of the struts and landing gear of the airplane may also be greatly reduced by applying the principles of this invention to such parts of the airplane. For example, the struts 34 connecting the wings 4 and 5 to the lower portion of the fuselage 3 may be provided with conduits 36 that are adapted to receive air as from the pipes 15 by means of feeder pipes 38 and to discharge this air through oppositely arranged slits or nozzle openings 37 positioned in front of the struts, as especially shown in Fig. 6. The struts of air from the nozzles 37 act to displace the air in advance of the struts outwardly and away from the strut to thereby create a region of reduced pressure between the jets or sheets of air and the struts which effects the substantial elimination of the drag of the struts.

The principles of this invention may be applied to bodies moving through fluids other than air, for example, such principles may be applied to the ship of Figs. 7 and 8 or the speed boat of Figs. 9 and 10. In Figs. 7 and 8 a ship 39 is propelled by a propeller 42. A centrifugal pump 38 is adapted to pump water taken from under the hull of the ship 39 out through a conduit 40 similar to the conduits 21, 27 and 31. The nozzle or slit 41 in conduit 40 projects this water downwardly in the form of a sheet or jet which acts to displace the oncoming water. The oncoming water in advance of the jet acts to deflect the jet backward absorbing its kinetic energy while the oncoming water is displaced downwardly and outwardly and away from the advancing hull. In other words, the displacing force is exerted largely by the jet and not by the forward hull surface 43.

In Figs. 9 and 10 the principles of the invention are applied to a speed boat 44 having a driving propeller 45. Such boats tend to settle at the stern and to counteract this tendency water is adapted to be forced out of a nozzle or jet 46 extending around the rear of the stern. Such water acts in the same manner as the air jet from the conduit 27. The jet of water drives the mass of water in advance of the jet downwardly thereby creating a region of increased pressure under the stern of the boat tending to lift the same. It is apparent that by forcing the water through jet 46 at a sufficiently high rate, the reaction of this jet of water combined with the increased water pressure under the stern will be sufficient to substantially lift the boat clear of the water so that it skims along the surface thereof.

It will be apparent that the conduits 27, 31 and 40 may be angularly adjustable if desired to thereby vary the effect of the fluid jets emitted from these conduits. Also, it is evident that the force and volume of the jets issuing from these and the remaining conduits may be varied as desired by varying the speed of rotation of the blower or centrifugal pump employed, to thereby maintain the operation of the jets at high efficiency through all speed variations of the moving body.

As many changes, could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. In combination with a traveling body moving through a fluid medium, wings secured to said body, said wings having orifices adjacent their trailing edges, said orifices being adapted to eject a sheet of fluid from the rear of the lower surfaces of said wings at a substantial angle to the direction of motion of said wings, said sheet of fluid acting to impede the free passage of fluid past said lower surfaces of said wings and causing an increase in the fluid pressure upon said lower surfaces.

2. In a body adapted to be propelled through a fluid medium, a fluid distributing member provided with a discharge orifice positioned towards the rear of said body, and fluid delivering means arranged to force fluid through said member and out of said orifice in a direction substantially at right angles to the direction of motion of said body, said escaping fluid acting upon said surrounding medium so as to cause said medium to exert an increased pressure against said body in a direction substantially at right angles to its direction of motion.

3. In a member having an entering portion, a body portion and a trailing portion adapted to be propelled through a fluid medium, a fluid distributing conduit provided with a discharge orifice extending along the trailing portion of said member, and fluid delivering means arranged to force fluid through said conduit and out of said orifice at an angle to the direction of motion of said member, to thereby create a region of increased pressure upon one side of said body portion in advance of said orifice, so as to tend to cause said body to move transversely of its path of motion and away from said region of increased pressure.

4. In an airplane, a wing having an entering edge, upper and lower wing surfaces and a trailing edge, a conduit provided with a nozzle shaped discharge orifice extending along the entering edge in advance thereof, blower means adapted to force air through said conduit and out of said orifice toward the upper side of said wing, to thereby create a region of reduced pressure in advance of said entering edge and over the upper surface of said wing, resulting in a decrease in the drag of said wing and an increase in its lift, and a second conduit provided with a nozzle shaped discharge opening extending along the trailing edge of said wing, said blower means being also adapted to force air through said second named conduit and out of its discharge orifice towards the under side of said wing, to thereby create a region of increased pressure in advance of said second named conduit and against the under surface of said wing, resulting in an increase in the lift thereof.

5. In an airplane, a wing having an entering edge, upper and lower wing surfaces and a trailing edge, a conduit provided with a nozzle shaped discharge orifice extending along the entering edge in advance thereof, blower means adapted to force air through said conduit and out of said orifice toward the upper side of said wing, to thereby create a region of reduced pressure in advance of said entering edge and over the upper surface of said wing, resulting in a decrease in the drag of said wing and an increase in its lift, a second conduit provided with a nozzle shaped discharge opening extending along the trailing edge of said wing, said blower means being also adapted to force air through said second named conduit and out of its discharge orifice towards the under side of said wing, to thereby create a region of increased pressure in advance of said second named conduit and against the under surface of said wing, resulting in an increase in the lift thereof and means for conveying air from said blower means to the region immediately behind the trailing edge of said wing so as to eliminate burbling.

6. In combination with a traveling body moving through a fluid medium, wings secured to said body, said wings having orifices extending along their lower surfaces adjacent their trailing edges and along their tips, said orifices serving to eject a sheet of fluid at high velocity, said fluid sheet extending along the rear and around a portion of the tips of said wings, and being projected at a substantial angle to the direction of motion of said wings, said sheet of fluid acting to impede the free passage of fluid past said lower surfaces while reducing wing tip losses.

7. In combination, an airplane body having wings, an engine and a connected propeller for propelling said body through a fluid medium, a clutch included in the connection between said engine and said propeller, a blower connected to said engine, and conduit means for discharging air delivered by said blower in high velocity sheet form from the under rear wing surfaces of said body to thereby impede the free passage of ambient air beneath said under wing surfaces and effect an increase in the lift of said wings, said lifting effect being enhanced during landing by operating said clutch to disconnect said propeller while speeding up said engine, whereby the velocity of said air sheet is accordingly increased.

In testimony that I claim the invention set forth above I have hereunto set my hand this 9th day of November, 1928.

FRAZER W. GAY.